(12) United States Patent
Sarkar et al.

(10) Patent No.: US 7,007,256 B2
(45) Date of Patent: Feb. 28, 2006

(54) METHOD AND APPARATUS FOR POWER CONSUMPTION ANALYSIS IN GLOBAL NETS

(75) Inventors: Aveek Sarkar, Mountain View, CA (US); Shyam Sundar, Sunnyvale, CA (US); Peter F. Lai, San Jose, CA (US); Rambabu Pyapali, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 129 days.

(21) Appl. No.: 10/383,092

(22) Filed: Mar. 6, 2003

(65) Prior Publication Data

US 2004/0177328 A1    Sep. 9, 2004

(51) Int. Cl.
*G06F 9/45*    (2006.01)
*G06F 9/455*    (2006.01)
*G06F 17/50*    (2006.01)

(52) U.S. Cl. .................. 716/6; 716/4; 716/11; 703/14; 703/19

(58) Field of Classification Search ................ 716/1–2, 716/4–14; 703/13–17, 19
See application file for complete search history.

(56) References Cited

U.S. PATENT DOCUMENTS

| | | | | |
|---|---|---|---|---|
| 5,535,370 A | * | 7/1996 | Raman et al. | ................. 703/15 |
| 5,691,910 A | * | 11/1997 | Thodiyil | ...................... 702/60 |
| 6,151,568 A | * | 11/2000 | Allen et al. | ................... 703/14 |
| 6,353,917 B1 | * | 3/2002 | Muddu et al. | ................. 716/6 |
| 6,557,148 B1 | * | 4/2003 | Nishida et al. | ................ 716/4 |
| 6,587,815 B1 | * | 7/2003 | Aingaran et al. | ............. 703/13 |
| 6,651,229 B1 | * | 11/2003 | Allen et al. | .................... 716/6 |
| 6,807,660 B1 | * | 10/2004 | Frenkil | .......................... 716/6 |

\* cited by examiner

*Primary Examiner*—Leigh M. Garbowski
(74) *Attorney, Agent, or Firm*—Zagorin O'Brien Graham LLP (57) ABSTRACT

The present invention describes a method and an apparatus for determining switching power consumption of global devices (e.g., repeaters, flops or the like) in an integrated circuit design during high-level design phase after the global routing for the integrated circuit is available. The clock cycle is divided into various timing intervals and the timing reports are generated for each cycle to determine a time-domain staggered distribution of each device's switching activity within a given timing interval. Each device's switching activity is analyzed within the given timing interval (or segment thereof). The power consumption is determined for each device that switches in the given timing interval.

30 Claims, 5 Drawing Sheets

METHOD AND APPARATUS FOR POWER CONSUMPTION ANALYSIS IN GLOBAL NETS

BACKGROUND

1. Field of the Invention

The present application relates to integrated circuit design and more specifically to power consumption analysis in the integrated circuit designs.

2. Description of the Related Art

Generally, in an integrated circuit, signals are routed through various nets for large distances within the integrated circuit. These nets propagate signals between various functional blocks (e.g., arithmetic and logic unit, floating point unit and the like) within the integrated circuit and/or between peripherals and the functional blocks within the integrated circuit. In a typical synchronous design, logic operations (e.g., switching or the like) are performed following a common event (e.g., rising or falling of the clock signal or the like). If the design requires these functions to be completed within one clock period then these operations must complete before the next common event (e.g., rising or falling of the next clock signal or the like). Thus, if a signal has to propagate from one functional block to another in one cycle time then the signal must start at the rising (or falling) edge of a clock cycle and reach its destination before the rising (or falling) edge of the next clock cycle.

The integrity of the signal (e.g., timings, signal slew requirement or the like) can be affected when the signal is routed through large distances within the integrated circuit. Typically, repeaters are inserted in the signal nets to ensure and maintain signal integrity. Sometimes, the delay in a signal net may become larger than the specified cycle time. Typically, in such cases, devices (e.g., flops, repeaters or the like) are inserted in the signal net to break the signal net into two separate paths, each one of which meets the cycle time requirement. Repeaters and flops are large devices that can draw significant switching current and hence consume large amount of switching power.

An accurate determination of the power consumption of repeaters and flops is required to design a robust power distribution for the integrated circuit. The accurate measures of power consumptions can be used to provide specifications for the design of a cooling system for the integrated circuit and to determine the overall power requirement of the system. Typically, the power consumption is determined after the integrated circuit design layout is completed and verified by circuit designers. If power consumption discrepancy is discovered after the layout is verified then the redesign effort to ameliorate the situation can be detrimental to design schedule because it adds significant delay (in some cases, months) into the design cycle. It is important to know the power consumption levels of each device (e.g., repeater, flop or the like) during the top level signal routing phase of the integrated circuit design cycle so that the designers can select repeaters and flops accordingly to maintain the design target for total power consumption of the integrated circuit.

Current power analysis tools provide conservative estimates of power consumption. Some tools require the availability of a complete and final design layout and that the layout must be free of all inaccuracies (e.g., power to ground shorts, power to signal shorts and the like). Further, these tools require information about the activity level for each block within the circuit design. The problem with these tools is that, they can only be used at the very end of the design cycle when the scope for making changes to the existing design generally do not exist and further, it takes a long time to generate the data for power consumption analysis by these tools.

Some other tools provide an estimate of the power consumption for the circuit design. The power consumed in the repeaters and flops is estimated by counting the number of repeaters and flops and the total power that can be consumed by each device is summed to estimate the total power that may be consumed by the design. The sum of total power consumed by each device is heuristically scaled by a factor that can be based on an estimation of the number of repeaters or flops that can switch in one clock period. The problem with these tools is that the analysis assumes that all the repeaters and flops switch at the same time. Thus, the estimates can be inaccurate and pessimistic. Therefore, an apparatus and a method are needed to accurately determine the power consumption of the integrated circuit design during high level design cycle.

SUMMARY

In some embodiment, the present invention describes a method and an apparatus for determining switching power consumption of global devices (e.g., repeaters, flops or the like) in an integrated circuit design during high-level design phase when the global routing for the integrated circuit is available. In some variations, the clock cycle of the integrated circuit is divided into various timing intervals. In some variations, timing reports are generated for each timing interval of the clock cycle to determine a time-domain staggered distribution of each device's switching activity within a given timing interval. In some variations, each device's switching activity is analyzed within the given timing interval (or segment thereof).

In some embodiments, a current profile of each device in the integrated circuit is determined for each one of the timing intervals. In some variations, the power consumption of each device that switches in a given timing interval is determined using the current profile for the given timing interval. In some variations, the power consumption analysis can be performed by staggering the current profiles of each one of the timing intervals.

In some embodiments, a method in use for in a design of an integrated circuit is described. The method includes preparing a time-domain staggered distribution of modeled switching for signal regeneration devices in nets of the integrated circuit design, prior to preparation of a layout of the integrated circuit design, and aggregating power consumption of selected groups of the signal generation devices for use in revision of the integrated circuit design. In some variations, the nets are global nets. In some embodiments, the method includes determining switching activity of one or more signal regeneration devices in one or more global nets, generating current profiles for the signal regeneration devices within each one of a plurality of timing intervals within a clock cycle and determining at least a component of power consumption of the integrated circuit using aggregate current profile of the signal regeneration devices in each one of the timing intervals for the clock cycle.

In some variations, the determining of switching activity of the signal regeneration devices includes determining a number of the signal regeneration devices for each one of the plurality of timing intervals within the clock cycle, determining exclusivity information for one or more buses, and adjusting the number of the signal regeneration devices for each one of the plurality of timing intervals within the clock cycle using the exclusivity information. In some variations, the exclusivity information represents a number of active bits in the buses at any given time. In some embodiments, the signal regeneration devices include one or more of flops and repeaters. In some variations, the current profile represents switching current drawn by each one of the signal regeneration devices within each one of the timing intervals. In some embodiments, the aggregate power consumption of selected groups of the signal generators is used to adjust one or more of a number of signal regeneration devices for the nets, length of the nets and types of the signal regeneration devices in the integrated circuit design.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
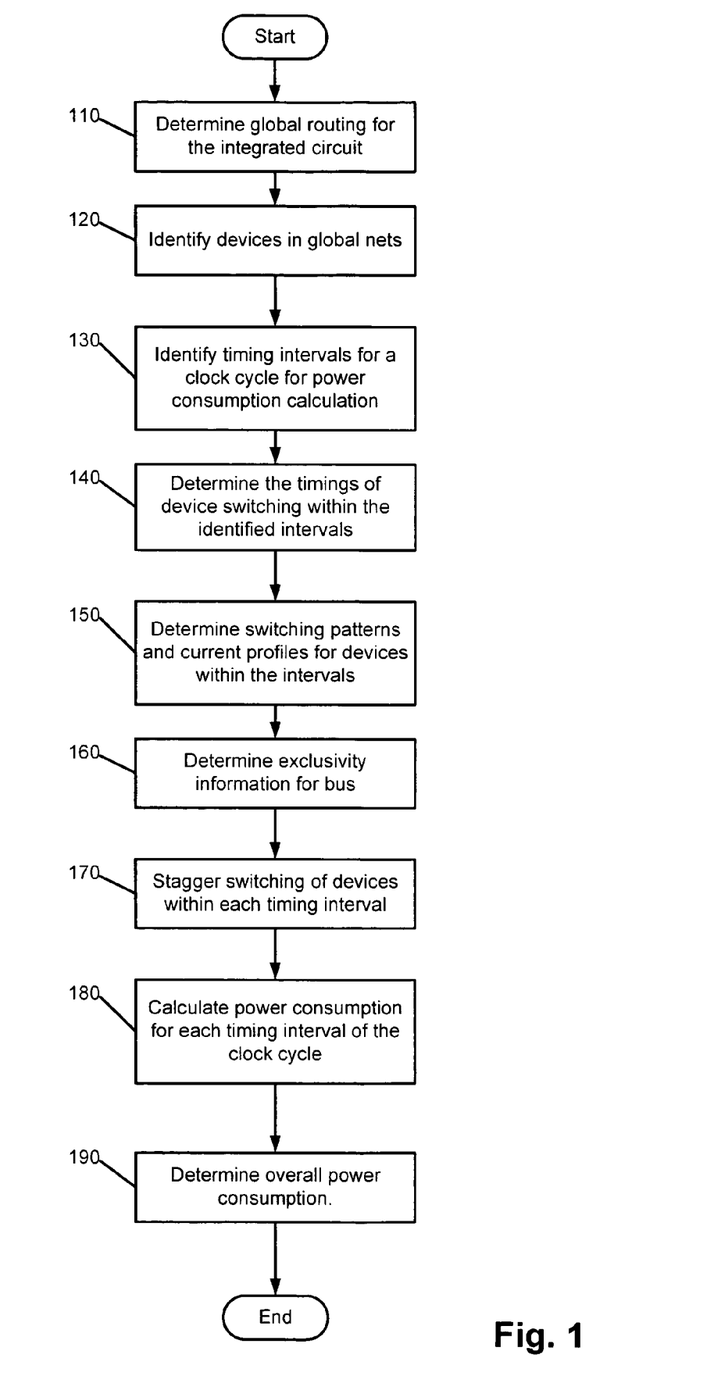
FIG. 1 is a flow diagram illustrating an exemplary sequence of operations performed during a process of determining power consumption of an integrated circuit according to an embodiment of the present invention.

FIG. 1 is a flow diagram illustrating an exemplary sequence of operations performed during a process of determining power consumption of an integrated circuit according to an embodiment of the present invention. While the operations are described in a particular order, the operations described herein can be performed in other sequential orders (or in parallel) as long as dependencies between operations allow. In general, a particular sequence of operations is a matter of design choice and a variety of sequences can be appreciated by persons of skill in art based on the description herein.

Initially, the process determines global routing for the integrated circuit design (110). The methods of performing global routing are known in the art. Various known routing tools can be used for the global routing. The process identifies the need for devices (flops, repeaters or the like) for the global nets (120). The devices for global nets are identified based on various factors affecting signal integrity (e.g., the distance a signal may travel on these nets, electrical parameters of the net, or the like). Typically, more than one device is inserted in longer global nets. The methods of adding devices in global nets are known in the art. The process identifies timing intervals for power consumption calculation (130). Timing intervals are determined based on cycle time of the integrated circuit. For example, if the cycle time is 1000 picoseconds (ps) then for analysis purposes, the 1000 ps time can be further divided into smaller intervals such as 100 intervals of 10 ps (e.g., 0–10 ps, 10–20 ps, 20–30 ps and the like). The length of intervals can be selected based on various factors (e.g., number of devices switching in each interval, the duration of one cycle, number of intervals required for calculation, number of devices in the circuit or the like).

The process determines the timings at which each device switches within the selected intervals (140). The timings of device switching can be determined using static timing analysis tools known in the art (e.g., Pearl static timing analyzer or the like). Typically, all devices do not switch at the same time within a clock cycle. The switching activity of each device depends upon when the device receives an input signal. The input signal may reach each device at different times within the same clock cycle, as determined by the characteristics of the net (e.g., length of the net, block delays or the like). For a synchronous design, every logical operation is performed within a clock cycle. A state achieved by the devices in a clock cycle is propagated to the next clock cycle on a rising (or falling) edge of the clock signal. For every net in the design, the static timing analysis tools generate a timing map that depicts the time sequence of logical operations in a net from one clock edge to another. The timing maps illustrate when each device switches with respect to the clock edge (rising or falling).

The information regarding when each device switches is used to determine the switching interval during which the device switches. For example, for purposes of illustration, if switching intervals are defined as 10 ps then a device that switches at 542 ps from the clock edge (rising or falling) can be considered to switch in the switching interval 540 ps–550 ps. The process categorizes all the repeaters into different switching timing intervals and generates information about the types and numbers of repeaters for each timing interval.

The process determines the switching patterns and current profiles for devices within the identified timing intervals (150). The switching patterns and current profiles for each device can be determined using known simulation tools (e.g., SPICE or the like). These tools can generate switching profile reports illustrating switching patterns that describe when a device switches under given signal conditions within a given timing interval. The current profiles illustrate the amount of current drawn by each device during the given timing interval. The process determines the exclusivity information for the switching patterns among the bits of busses within the integrated circuit (160). For example, if a bus is one-hot encoded then only two bits in the bus can switch in one cycle. The switching information for other bits in the bus can be suppressed or ignored. Within a one-hot encoded bus, a net can be switching OFF while another net is switching ON or vice versa. In such case, the switching information for the rest of the nets within the one-hot encoded bus can be ignored.

The exclusivity information can be obtained from an understanding of the logical functionality of the design (e.g., from circuit's logic designer, circuit specifications or the like). This information can be used to determine how many devices switch within each timing interval. The static timing analyzers known in the art can provide information for all the nets in the design. The data generated by the static timing analyzers provides information about switching activities of all the devices within these nets. Generally, all the nets do not switch on the same clock edge. The circuit related information (e.g., circuit specifications, design implementations or the like) can provide data regarding the switching activities of each net. Once the switching information is known, only the nets that switch in a given timing interval can be considered for the analysis. For example, in a 6-bit wide bus, if only two bits are on at any given time then at the most, four nets in the bus of 6-signals can switch (i.e., two nets turn on and two nets turn off) during the given timing interval. Thus, in such case, the devices that are on the four switching nets can be considered for the analysis and device on the remaining two nets can be ignored.

The process staggers the devices that switch within each timing interval of each clock cycle (170). For each cycle, the number of devices switching within each timing interval is aggregated to determine the total switching activity for that clock cycle. Each clock cycle is divided into various timing intervals during which these devices switch. The switching information within each timing interval can be further subdivided for detailed analysis. When fewer devices switch closer to the clock edge than for intervals closer to the clock edges, further sub-division of timing interval may not be necessary. Typically, most of the devices transition in the middle of the clock cycle. Thus, for timing intervals that fall in the middle of the clock period, a further sub-division of the timing intervals can increase the accuracy of the final result. For example the timing intervals with higher concentration of devices can be further sub-divided for better granularity.

The process calculates the power consumption during each timing interval (180). The power consumption (e.g., peak, RMS, average or the like) for a given timing interval can be calculated using the current profile of each device switching in that timing interval. A timing map for device activity can be generated using the timing analysis tools known in the art. The number of devices switching and the transition of each device (i.e. whether the input to a device is going high from low or going low from high or the like) within a given timing interval (or segment thereof) can be determined from the timing map. Thus, using this information and the current profile for each device, a time-staggered profile of the current drawn from the power grid of the integrated circuit by the devices is determined. The process determines the overall power consumption for the integrated circuit using the power consumption of each individual timing interval (190). The current profile can be used to determine the power consumption of the devices within the clock cycle of the integrated circuit and hence during the normal operating conditions of the integrated circuit.

Once the switching patterns for devices are determined, the switching patterns can be further divided for detailed analysis based on various factors for example, the amount of current drawn by each device, types of device (flop, repeater or the like), location in the net, switching times or the like. Table 1 illustrates an example of a sample distribution, during various time intervals within a clock period, of a particular type of device for example, repeaters of type 'A', where 'A' can be any criteria selected for analysis as described herein.

For purposes of illustration, in the present example, the clock period is 1000 picoseconds (ps) and timing intervals are defined as 25 ps each. As described herein, the timing intervals can be defined for any length desired for specific granularity using switching pattern tools. The column for total number of devices switching illustrates the number of devices of all types (e.g., repeaters, flops or the like) switching during the given timing interval. The column for the number of type 'A' devices switching illustrates the total number of type 'A' devices switching among all the devices during the given timing interval.

TABLE 1

A sample distribution of type 'A' device switching.

| Timing interval (picoseconds) | Total number of devices switching | Number of type 'A' devices switching |
|---|---|---|
| 0 to 25 | 0 | 0 |
| 25 to 50 | 0 | 0 |
| 50 to 75 | 0 | 0 |
| 75 to 100 | 0 | 0 |
| 100 to 125 | 0 | 0 |
| 125 to 150 | 0 | 0 |
| 150 to 175 | 0 | 0 |
| 175 to 200 | 3 | 1 |
| 200 to 225 | 164 | 125 |
| 225 to 250 | 435 | 112 |
| 250 to 275 | 617 | 125 |
| 275 to 300 | 941 | 216 |
| 300 to 325 | 615 | 75 |
| 325 to 350 | 696 | 133 |
| 350 to 375 | 792 | 186 |
| 375 to 400 | 849 | 173 |
| 400 to 425 | 904 | 200 |
| 425 to 450 | 891 | 157 |
| 450 to 475 | 851 | 155 |
| 475 to 500 | 857 | 182 |
| 500 to 525 | 908 | 162 |
| 525 to 550 | 977 | 173 |
| 550 to 575 | 1040 | 212 |
| 575 to 600 | 950 | 157 |
| 600 to 625 | 903 | 185 |
| 625 to 650 | 1134 | 183 |
| 650 to 675 | 1112 | 180 |
| 675 to 700 | 870 | 142 |
| 700 to 725 | 717 | 167 |
| 725 to 750 | 460 | 123 |
| 750 to 775 | 349 | 91 |
| 775 to 800 | 254 | 52 |
| 800 to 825 | 205 | 51 |
| 825 to 850 | 162 | 35 |
| 850 to 875 | 125 | 29 |
| 875 to 900 | 123 | 18 |
| 900 to 925 | 80 | 20 |
| 925 to 950 | 60 | 9 |
| 950 to 975 | 60 | 14 |
| 975 to 1000 | 33 | 9 |

In the present example, none of the devices switch between 0 ps and 175 ps of the clock period. During the timing interval of 175 ps and 200 ps, a total of three devices switch among which one is of type 'A'. Similarly, during various timing periods, different numbers of devices switch depending upon when each device receives the signal. The timing intervals can be further redefined to improve the granularity of the analysis. For example, during 275 ps and 300 ps, a total of 941 devices switch among which 216 are of type 'A'. To obtain a different switching profile, the timing intervals can be defined, for example, 10 ps each. Then, the total number of devices switching between 275 ps and 300 ps can be reduced per interval for analysis purposes. Similarly, one skilled in art will appreciate that while for illustration purposes, switching activities of all the devices and the devices of type A are shown in table 1, however, the switching profile reports can be configured to include various types of devices to obtain various different combinations of switching profiles for the integrated circuit.

Figure 2:
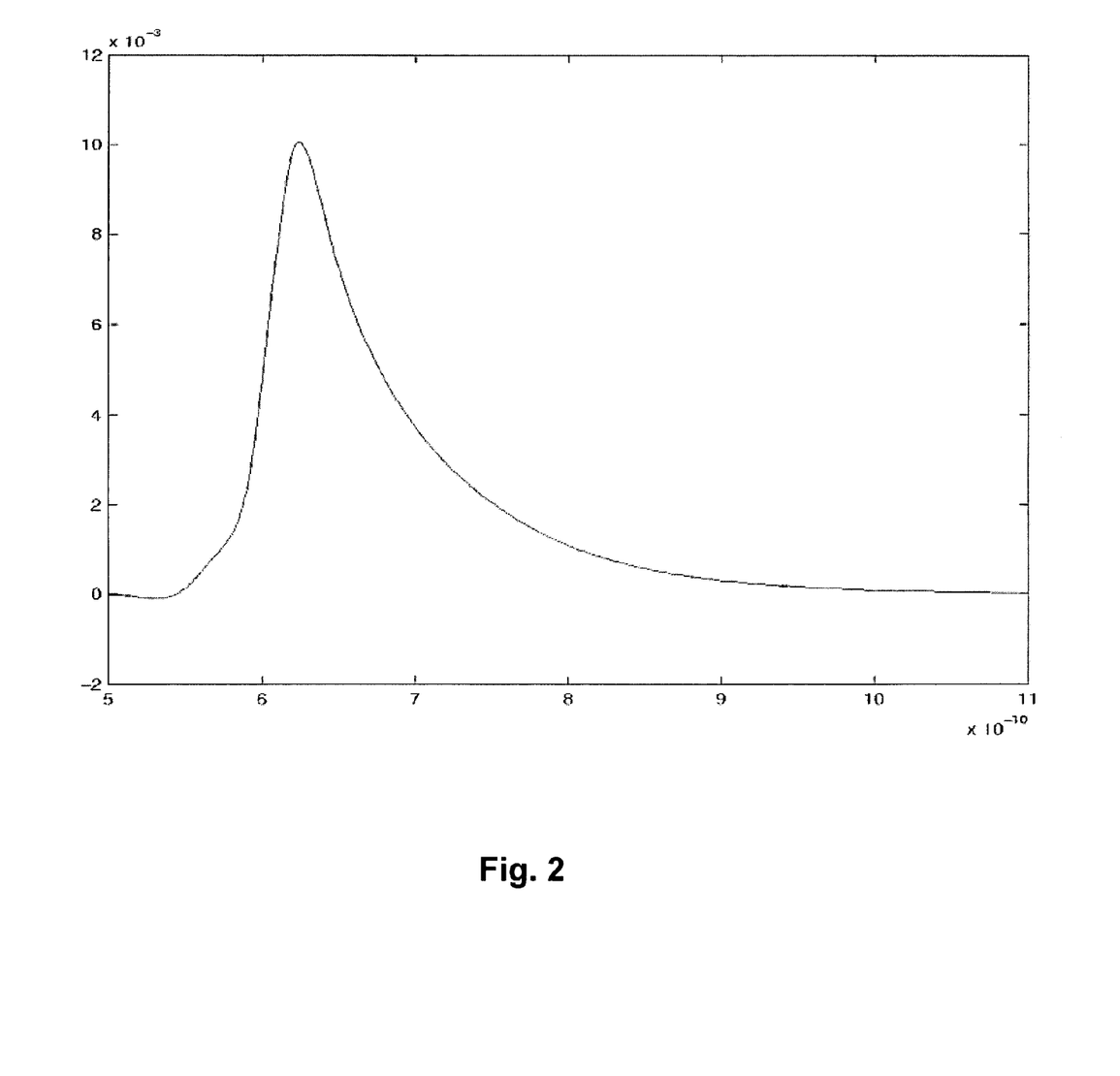
FIG. 2 illustrates an example of current profile for a particular device in a given timing interval according to an embodiment of the present invention.

FIG. 2 illustrates an example of a current profile for a particular device in a given timing interval according to an embodiment of the present invention. The timing interval for switching is approximately 10 ps. According to the exemplary current profile, the device draws maximum current between 6 ps and 7 ps of the given timing interval. Similarly, the current profiles for various numbers of devices can be generated during the given timing interval to determine the total current profile for the integrated circuit during each of the timing intervals. Typically, the devices of same types draw similar amounts of current during the switching.

Figure 3:
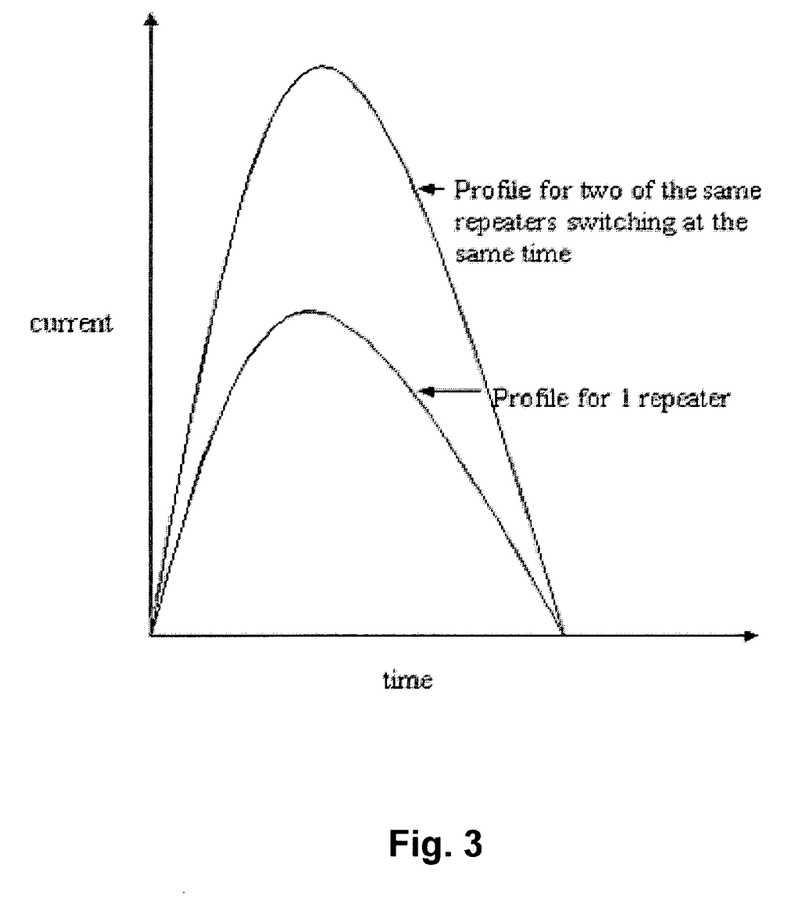
FIG. 3 illustrates an example of current profiles for two devices in a given timing interval according to an embodiment of the present invention.

FIG. 3 illustrates an example of current profiles for two devices in a given timing interval according to an embodiment of the present invention. For purposes of illustration, in the present example, the profiles of two repeater are shown. Typically, when two repeaters of same types switch during a given timing interval then the total amount of current drawn by the two repeaters is twice as much as the current drawn by one repeater. Thus, by determining the number of devices of a particular type switching in a given timing interval, for example using the data given in table 1, the total current profile for the integrated circuit for the given timing interval can be determined.

Exemplary Implementation

For purposes of illustration, in the present example, an integrated circuit includes devices of type 'A'. One skilled in art will appreciate that the integrated circuit can include devices of various different types (e.g., repeaters, flops or the like or a combination thereof). In the present example, the cycle time is 600 ps and the timing intervals are defined for 50 ps each. Table 2 illustrates an example of a switching profile generated using the known tools (e.g., SPICE or the like) for the given integrated circuit for each timing interval. Because only one type of device is used in the present example, the total number of devices switching is the same as the number of type 'A' devices switching. However, if more types of devices are used, then a switching profile similar to the one illustrated in table 1 can be generated.

Initially, in the present example, there is no switching activity at the beginning of the clock period until 250 ps. During 250 ps and 300 ps timing interval, 2 devices switch and between 300 ps and 350 ps, two other devices switch and so on. In the present example, for illustration purposes, all the devices switch at the same time in a given timing interval, however, one skilled in art will appreciate that these devices can switch at different points in time within the given timing interval. The current profiles of these devices can be generated using known tools (e.g., SPICE or the like). Because all the devices in the present example are of type 'A', the current profile for each device is generally similar. Therefore a composite current profile for the integrated circuit can be generated.

TABLE 2

An example of switching distribution of type 'A' devices in the present example.

| Timing interval (picoseconds) | Total number of devices switching | Number of type 'A' devices switching |
|---|---|---|
| 0–50 ps | 0 | 0 |
| 50–100 ps | 0 | 0 |
| 100–150 ps | 0 | 0 |
| 150–200 ps | 0 | 0 |

TABLE 2-continued

An example of switching distribution of type 'A' devices in the present example.

| Timing interval (picoseconds) | Total number of devices switching | Number of type 'A' devices switching |
|---|---|---|
| 200–250 ps | 0 | 0 |
| 250–300 ps | 2 | 2 |
| 300–350 ps | 2 | 2 |
| 350–400 ps | 1 | 1 |
| 400–450 ps | 2 | 2 |
| 450–500 ps | 0 | 0 |
| 500–550 ps | 1 | 1 |
| 550–600 ps | 0 | 0 |

Figure 4:
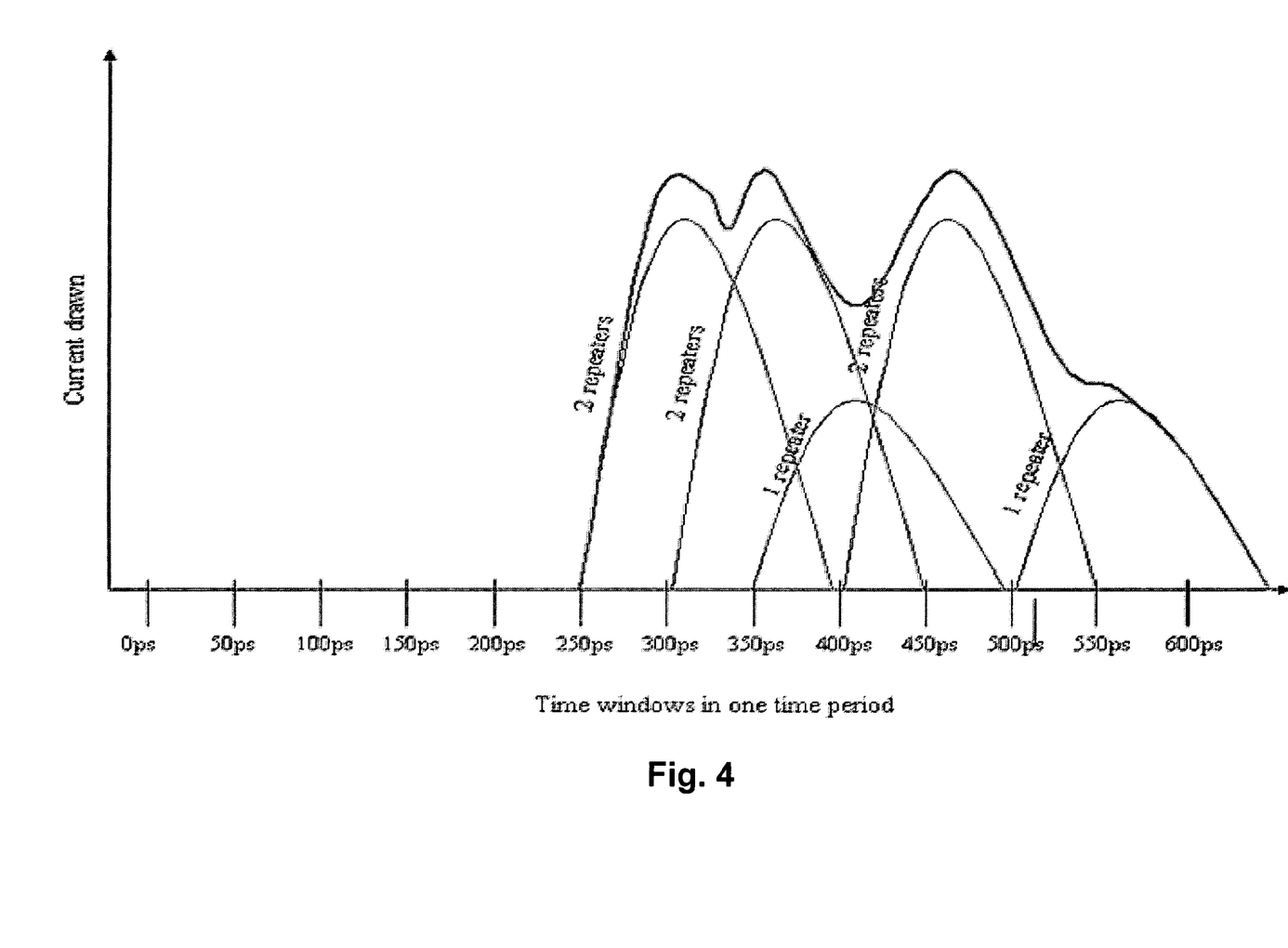
FIG. 4 illustrates an example of composite current profile for the given integrated circuit according to an embodiment of the present invention.
Figure 5A:
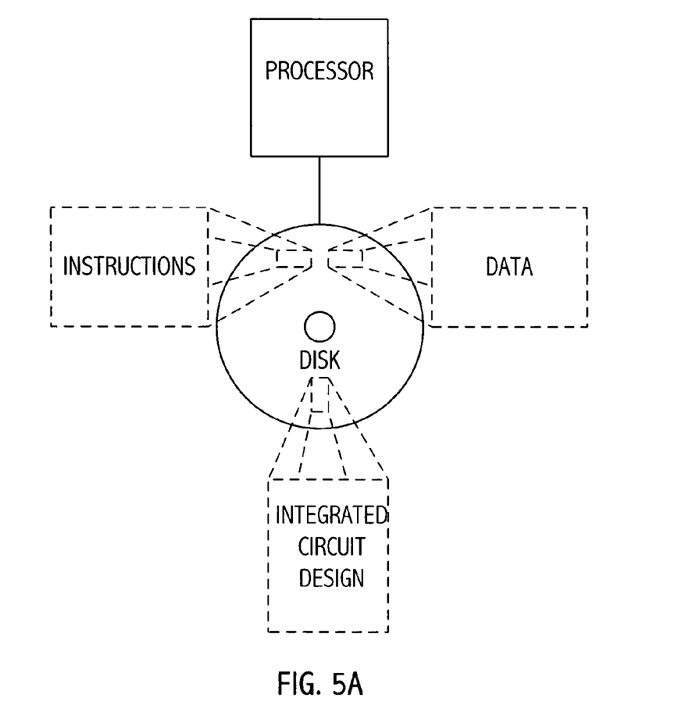
FIG. 5A illustrates an apparatus consistent with at least one embodiment of the present invention.
Figure 5B:
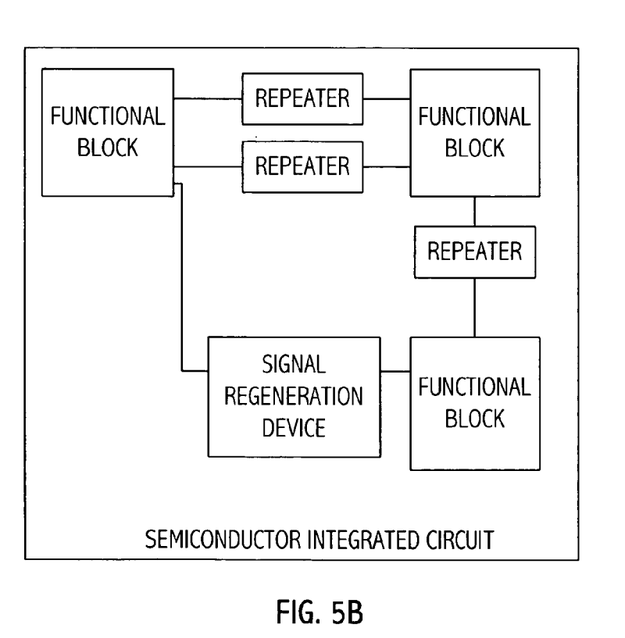
FIG. 5B illustrates a semiconductor integrated circuit consistent with at least one embodiment of the present invention.

FIG. 4 illustrates an example of composite current profile for the given integrated circuit according to an embodiment of the present invention. In the present example, each device draws current from the power supply. Typically, when two devices of same type switch together, they draw twice as much current (and hence, twice as much power) as any one of them drawing individually. Generally, the current drawn by the devices in one timing interval does not reduce to zero before the next timing interval begins. Thus, there is an overlap between the current profiles of timing interval 250 ps–300 ps and 300 ps–350 ps. The current profile between the two timing intervals is staggered. Similarly, the current profiles of remaining timing intervals can be staggered and a cumulative current profile can be generated for the given clock period.

Because the switching patterns of global nets are mutually exclusive (i.e., some nets switch in certain clock cycles while the others do not), the power consumption of devices in these nets varies from one cycle to another. By considering the mutually exclusive switching nature of the global nets, the cumulative current profiles can be generated, using known current profiling tools, for all clock periods to obtain the current profile for the integrated circuit under operating conditions. The current profiles then can be used to analyze the power consumption data for the integrated circuit.

While for purposes of illustration a current profile for one type of device is described, one skilled in art will appreciate that integrated circuits can include various types of devices. Further, the current profiles for individual devices can vary even for the same type of devices. Other factors include the switching profile for each device, for example, the current drawn by a device switching from high to low can be different from a device switching from low to high.

The above description is intended to describe at least one embodiment of the invention. The above description is not intended to define the scope of the invention. Rather, the scope of the invention is defined in the claims below. Thus, other embodiments of the invention include other variations, modifications, additions, and/or improvements to the above description. The functionality of multiple operations may be combined into a single operation, and/or the functionality of a single operation may be distributed in additional operations. Moreover, alternative embodiments may include multiple instances of a particular operation, and the order of operations may be altered in various other embodiments.

The above described method, the operations thereof and modules therefor may be executed on a computer system configured to execute the operations of the method and/or may be executed from computer-readable media. Computer systems may be found in many forms including but not limited to mainframes, minicomputers, servers, workstations, personal computers, notepads, personal digital assistants, various wireless devices and embedded systems, just to name a few. A typical computer system includes at least one processing unit, associated memory and a number of input/output (I/O) devices. A computer system processes information according to a program and produces resultant output information via I/O devices. A program is a list of instructions such as a particular application program and/or an operating system. A computer program is typically stored internally on computer readable storage media or transmitted to the computer system via a computer readable transmission medium. A computer process typically includes an executing (running) program or portion of a program, current program values and state information, and the resources used by the operating system to manage the execution of the process. A parent computer process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

The method described above may be embodied in a computer-readable medium for configuring a computer system to execute the method. The computer readable media may be permanently, removably or remotely coupled to a system. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein.

While particular embodiments of the present invention have been shown and described, one skilled in the art will appreciate that, based upon the teachings herein, various modifications, alternative constructions, and equivalents may be used without departing from the invention claimed herein. Consequently, the appended claims encompass within their scope all such changes, modifications, etc. as are within the spirit and scope of the invention. Furthermore, it is to be understood that the invention is solely defined by the appended claims. The above description is not intended to present an exhaustive list of embodiments of the invention. Unless expressly stated otherwise, each example presented herein is a non-limiting or nonexclusive example, whether or not the terms non-limiting, nonexclusive or similar terms are contemporaneously expressed with each example. Although an attempt has been made to outline some exemplary embodiments and exemplary variations thereto, other embodiments and/or variations are within the scope of the invention as defined in the claims below.

What is claimed is:

1. A method for use in a design of an integrated circuit, the method comprising:
   prior to preparation of a layout of the integrated circuit design, preparing a time-domain staggered distribution of modeled switching for signal regeneration devices in nets of the integrated circuit design; and
   aggregating power consumption of selected groups of the signal regeneration devices according to the time-domain staggered distribution for use in revision of the integrated circuit design.

2. The method of claim 1, wherein the nets are global nets.

3. The method of claim 1, further comprising:
   determining switching activity of one or more signal regeneration devices, in one or more nets;
   generating current profiles for the signal regeneration devices within each one of a plurality of timing intervals within a clock cycle; and
   determining at least a component of power consumption of the integrated circuit using an aggregate current profile of the signal regeneration devices in each one of the timing intervals for the clock cycle.

4. The method of claim 3, wherein the determining of switching activity of the signal regeneration devices comprises:
   determining a number of the signal regeneration devices for each one of the plurality of timing intervals within the clock cycle;
   determining exclusivity information for one or more buses; and
   adjusting the number of the signal regeneration devices for each one of the plurality of timing intervals within the clock cycle using the exclusivity information.

5. The method of claim 4, wherein the exclusivity information represents a number of active bits in the buses at any given time.

6. The method of claim 3, wherein the current profile represents switching current drawn by each one of the signal regeneration devices within each one of the timing intervals.

7. The method of claim 1, wherein the signal regeneration devices include one or more of flops and repeaters.

8. The method of claim 1, wherein the aggregate power consumption of selected groups of the signal regeneration devices is used to adjust one or more of a number of signal regeneration devices for the nets, length of the nets and types of the signal regeneration devices in the integrated circuit design.

9. An integrated circuit made by the method of claim 1.

10. A circuit analysis tool comprising:
    at least one functional sequence embodied in computer readable media that prepares a time-domain staggered distribution of modeled switching for signal regeneration devices in nets of the integrated circuit design prior to preparing a layout of the integrated circuit design; and
    at least one functional sequence embodied in computer readable media that aggregates power consumption of selected groups of the signal regeneration devices according to the time-domain staggered distribution for use in revision of the integrated circuit design.

11. The circuit analysis tool of claim 10, wherein the nets are global nets.

12. The circuit analysis tool of claim 10, further comprising:
    at least one functional sequence embodied in computer readable media that determines switching activity of one or more signal regeneration devices, in one or more nets;
    at least one functional sequence embodied in computer readable media that generates current profiles for the signal regeneration devices within each one of a plurality of timing intervals within a clock cycle; and at least one functional sequence embodied in computer readable media that determines at least a component of power consumption of the integrated circuit using an aggregate current profile of the signal regeneration devices in each one of the timing intervals for the clock cycle.

13. The circuit analysis tool of claim 12, further comprising:
at least one functional sequence embodied in computer readable media that determines a number of the signal regeneration devices for each one of the plurality of timing intervals within the clock cycle;
at least one functional sequence embodied in computer readable media that determines exclusivity information for one or more buses; and
at least one functional sequence embodied in computer readable media that adjusts the number of the signal regeneration devices for each one of the plurality of timing intervals within the clock cycle using the exclusivity information.

14. The circuit analysis tool of claim 13, wherein the exclusivity information represents a number of active bits in the buses at any given time.

15. The circuit analysis tool of claim 12, wherein the current profile represents switching current drawn by each one of the signal regeneration devices within each one of the timing intervals.

16. The circuit analysis tool of claim 10, wherein the signal regeneration devices include one or more of flops and repeaters.

17. The circuit analysis tool of claim 10, further comprising:
at least one functional sequence embodied in computer readable media that adjusts one or more of a number of signal regeneration devices for the nets, length of the nets and types of the signal regeneration devices in the integrated circuit design, based on at least aggregate power consumption of selected groups of the signal generators.

18. An apparatus comprising:
means for preparing a time-domain staggered distribution of modeled switching for signal regeneration devices in nets of the integrated circuit design, prior to preparation of a layout of the integrated circuit design; and
means for aggregating power consumption of selected groups of the signal regeneration devices according to the time-domain staggered distribution for use in revision of the integrated circuit design.

19. The apparatus of claim 18, wherein the nets are global nets.

20. The apparatus of claim 18, further comprising:
means for determining switching activity of one or more signal regeneration devices, in one or more nets;
means for generating current profiles for the signal regeneration devices within each one of a plurality of timing intervals within a clock cycle; and
means for determining at least a component of power consumption of the integrated circuit using an aggregate current profile of the signal regeneration devices in each one of the timing intervals for the clock cycle.

21. The apparatus of claim 20, further comprising:
means for determining a number of the signal regeneration devices for each one of the plurality of timing intervals within the clock cycle;
means for determining exclusivity information for one or more buses; and
means for adjusting the number of the signal regeneration devices for each one of the plurality of timing intervals within the clock cycle using the exclusivity information.

22. A computer readable encoding of a semiconductor integrated circuit design, the computer readable encoding comprising:
one or more design file media encoding representation of a plurality of signal regeneration devices; and
one or more design file media encoding representations of nets defined through respective ones of the devices,
at least one profile of
power consumption of the semiconductor integrated circuit determined based on a time-domain staggered distribution of modeled switching for signal regeneration devices in nets of the integrated circuit design, prior to preparation of a layout of the integrated circuit design; and
at least one profile of power consumption of selected groups of the signal regeneration devices aggregated according to the time-domain staggered distribution.

23. The computer readable encoding of claim 22, wherein the nets are global nets.

24. The computer readable encoding of claim 22, wherein the profile of power consumption of the integrated circuit is further determined by determining switching activity of one or more signal regeneration devices, in one or more nets;
generating current profiles for the signal regeneration devices within each one of a plurality of timing intervals within a clock cycle; and
determining at least a component of power consumption of the integrated circuit using an aggregate current profile of the signal regeneration devices in each one of the timing intervals for the clock cycle.

25. The computer readable encoding of claim 24, wherein the switching activity of the signal regeneration devices is determined by
determining a number of the signal regeneration devices for each one of the plurality of timing intervals within the clock cycle;
determining exclusivity information for one or more buses; and
adjusting the number of the signal regeneration devices for each one of the plurality of timing intervals within the clock cycle using the exclusivity information.

26. The computer readable encoding of claim 25, wherein the exclusivity information represents a number of active bits in the buses at any given time.

27. The computer readable encoding of claim 24, wherein the current profile represents switching current drawn by each one of the signal regeneration devices within each one of the timing intervals.

28. The computer readable encoding of claim 22, wherein the signal regeneration devices include one or more of flops and repeaters.

29. The computer readable encoding of claim 22, wherein the aggregate power consumption of selected groups of the signal regeneration devices is used to adjust one or more of a number of signal regeneration devices for the nets, length of the nets and types of the signal regeneration devices in the integrated circuit design.

30. The computer readable encoding of claim 22,
wherein each of the one or more design file media are selected from a set of a disk, tape or other magnetic, optical, semiconductor or electronic storage medium and a network, wireless, wireline, or other communication medium.

* * * * *